(No Model.)
J. T. HART.
VEHICLE HUB.
No. 491,925.
Patented Feb. 14, 1893.
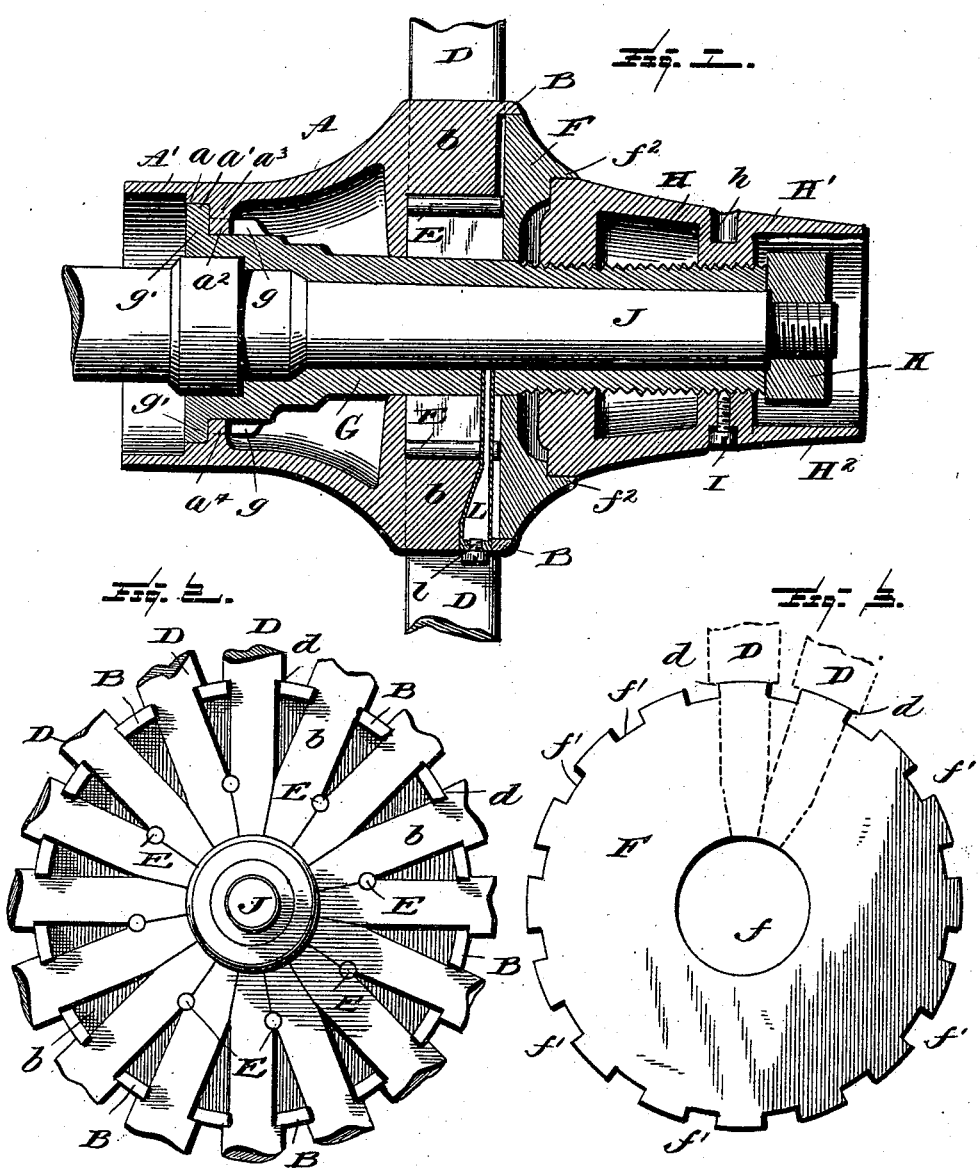
Witnesses
L. C. Hills.
E. H. Boud.
Inventor
Joel T. Hart,
per Chas. H. Fowler
Attorney

UNITED STATES PATENT OFFICE.

JOEL T. HART, OF PLEASANT HILL, MISSOURI.

VEHICLE-HUB.

SPECIFICATION forming part of Letters Patent No. 491,925, dated February 14, 1893.

Application filed May 7, 1892. Serial No. 432,174. (No model.)

*To all whom it may concern:*

Be it known that I, JOEL T. HART, a citizen of the United States, residing at Pleasant Hill, in the county of Cass and State of Missouri, have invented certain new and useful Improvements in Vehicle Hubs and Wheels; and I do hereby declare that the following is a full, clear, and exact description of the same, reference being had to the annexed drawings, making a part of this specification, and to the letters of reference marked thereon.

This invention relates to certain new and useful improvements in vehicle hubs and wheels and it has for its objects among others to provide an improved cheap and durable wheel and hub which shall be easily separated and assembled and which will be easily and cheaply made and repaired. The hub is made in two parts one with spoke sockets and with lugs between them which lugs have right-angled extensions fitted to corresponding openings in the other part and in sockets or against shoulders on the spokes. The axle-box has screw-threaded engagement with one part of the hub and is thereby drawn up against the other part. The hub is made substantially hollow to render it as light as possible. The parts are so fitted as to make close and tight joints to exclude the storm and moisture. Keys are employed which are driven in between two spokes to hold them against withdrawal and also to hold them against each other and prevent their rattling or becoming loose. The hub is provided with a lubricator the inner end of the delivery tube of which is reduced so as to prevent the escape of the oil. The parts constituting the hub and wheel may be readily and easily separated or assembled and when complete the wheel is not liable to become broken or any of the parts to separate.

Other objects and advantages of the invention will hereinafter appear and the novel features thereof will be specifically defined by the appended claims.

The invention is clearly illustrated in the accompanying drawings, which, with the letters of reference marked thereon, form a part of this specification and in which Figure 1 is a central longitudinal section through my improved hub with the axle and portion of two of the spokes in side elevation. Fig. 2 is an end view of the wheel with the spokes broken off and the plate removed. Fig. 3 is an inner face view of this detached plate, showing by dotted lines portions of two spokes in position.

Like letters of reference indicate like parts throughout the several views.

Referring now to the details of the drawings by letter, A designates the main part of the hub which is formed at its outer end with the band A' with internal shoulder $a$ and an annular groove or recess $a'$ with shoulder $A^2$ and flange $a^3$ which flange is formed with channels or grooves for the reception of longitudinal ribs on the axle box which prevents turning of the said box as will be hereinafter explained. The main part A is practically hollow as seen in Fig. 1 and at its inner end is formed with spoke sockets each two of which are separated by the wedge-shaped lugs $b$ integral with the said main part as seen in Figs. 1 and 2 and which extend about two thirds of the distance from the periphery to the center of the main part as seen best in Fig. 2. These lugs at their outer ends are formed with the flanges B which are arranged flush with the periphery of the said main part as seen in Figs. 1 and 2 and are designed to fit peripheral notches $f'$ in the plate F which is shown detached in Fig. 3 and in position in Fig. 1. These flanges also engage beneath the shoulders of the spokes as seen in Fig. 2.

The spokes D have tapered inner ends which are driven into the sockets therefor between the wedge-shaped lugs as seen in Fig. 2, till their shoulders $d$ engage the flanges B as seen in Fig. 2 and then the keys E are driven horizontally into the space at the inner end of the wedge-shaped lug and into substantially semicircular notches in the adjacent faces of the spokes as seen in Figs. 1 and 2, the keys being of such length that when driven in their outer ends will be substantially flush with the outer faces of the wedge-shaped lugs as seen in Figs. 1 and 2 so that they will not interfere with the application of the plate F which as seen in Fig. 3 has a central opening $f$ for the axle box and upon its periphery has the notches $f'$ for the reception of the flanges B of the main part as seen in Fig. 1.

G is the axle box; it is formed with radial ribs $g$ as seen in Fig. 1 which are designed to fit the channels or grooves $a^4$ of the main part and thus prevent turning of the box. It is formed at its inner end with an annular flange $g'$ as seen in Fig. 1 to engage the flange $a^3$ of the main part and fit in the recess $a'$ thereof as seen in Fig. 1. This axle box passes through the central opening in the main part and through the central opening $f$ of the plate F and beyond said latter opening it is screw threaded as seen at $g^2$. The plate F has an outwardly-extending peripheral flange $f^2$ as seen in Fig. 1 to embrace the nut H which is substantially hollow with a threaded opening at the inner end and a threaded partition H' and at the outer end with a band $H^2$; the nut is screwed upon the threaded end of the axle box, the threads of the axle box engaging the threads of the inner end and the partition of the nut, the nut being provided with a hole $h$ or openings for the reception of a wrench or other device by which it may be turned up in the usual manner and when turned up it binds the parts together.

I is a set screw engaging a threaded hole in the partition of the nut with the head seated in a countersink or socket in the nut, its inner end engaging the threads of the axle box after the parts are assembled and serves to prevent accidental displacement or getting loose of the nut.

J is the axle seated in the box and provided at its outer end with a nut K as seen in Fig. 1.

L is an oil tube or receptacle which is placed between the spokes as seen in Fig. 1 at the end of one of the wedge shaped lugs and extended inward through the axle box as seen in Fig. 1, its outer end, which may extend any desired distance between the spokes, being provided with a suitable feed opening closed by a screw cap $l$ as shown and its inner end reduced so as to prevent the oil from wasting; this forms a convenient and cheap self-oiling hub.

The advantages of such a construction as is above set forth will be readily appreciated; the parts can be readily separated by simply unscrewing the nut and when assembled they are tightly held together; there is practically no wear, no danger of accidental separation, and the spokes are held against rattling.

Modifications in detail may be resorted to without departing from the spirit of the invention or sacrificing any of its advantages.

What I claim as new is;—

1. The combination with the main part with its spoke sockets and wedge-shaped lugs with flanges, of the plate with flanges and notches, the axle box with radial ribs at one end and screw threads at the other and the nut engaging the threads of the axle box and holding the plate in place, as set forth.

2. The combination with the main part with its spoke sockets annular shoulder and interior flange and wedge shaped lugs with flanges, of the plate with flanges and notches, the axle box with radial ribs at one end and screw threads at the other, and the nut engaging the threads of the axle box and holding the plate in place, as set forth.

3. The combination with the main part with its spoke sockets and wedge-shaped lugs with flanges, of the plate with flange and notches, the axle box with threads at its outer end, the nut with threaded openings and wrench-hole and the set screw in the said nut engaging the axle box, substantially as specified.

In testimony that I claim the above I have hereunto subscribed my name in the presence of two witnesses.

JOEL T. HART.

Witnesses:
ZENAS LEONARD,
F. T. BUCKNER.